US005148072A

United States Patent [19]

Shiroyama

[11] Patent Number: 5,148,072

[45] Date of Patent: Sep. 15, 1992

[54] BRUSH HOLDING DEVICE

[75] Inventor: Shigeru Shiroyama, Hyogo, Japan

[73] Assignee: Mitsubishi Denki K.K., Tokyo, Japan

[21] Appl. No.: 544,781

[22] Filed: Jun. 27, 1990

[30] Foreign Application Priority Data

Jun. 28, 1989 [JP] Japan .............................. 1-76960[U]

[51] Int. Cl.[5] ............................................ H02K 13/00

[52] U.S. Cl. ...................................... 310/239; 310/42; 310/43

[58] Field of Search ...................... 310/89, 43, 91, 239, 310/241, 242, 245, 247, 249, 42

[56] References Cited

U.S. PATENT DOCUMENTS

| | | | |
|---|---|---|---|
| 3,493,802 | 2/1970 | Barthruff | 310/239 |
| 3,628,075 | 12/1971 | Dafler | 310/239 |
| 4,475,053 | 10/1984 | Mayer | 310/239 |
| 4,673,836 | 6/1987 | Akiyama | 310/239 |
| 4,673,838 | 6/1987 | Takagi | 310/239 |
| 4,746,828 | 5/1988 | Nado | 310/239 |
| 4,754,184 | 6/1988 | Morikane | 310/239 |
| 4,785,214 | 11/1988 | Mummert | 310/241 |
| 4,922,149 | 5/1990 | Isozumi | 310/89 |

FOREIGN PATENT DOCUMENTS

| | | | |
|---|---|---|---|
| 0253964 | 6/1961 | Australia | 310/239 |
| 1148646 | 5/1963 | Fed. Rep. of Germany | 310/239 |
| 37-145454 | 9/1962 | Japan . | |
| 53-2803 | 1/1978 | Japan . | |
| 62-33498 | 8/1987 | Japan . | |
| 0318528 | 12/1989 | Japan | 310/239 |

*Primary Examiner*—R. Skudy

*Attorney, Agent, or Firm*—Sughrue, Mion, Zinn Macpeak & Seas

[57] ABSTRACT

A brush holding device wherein the number of components and the number of steps of production are reduced and a holding frame does not suffer from rust and hence does not stick to a brush. The brush holding device comprises a base plate formed from a steel plate, a plurality of brush holding frames made of an electrically insulating synthetic resin material and secured to the base plate, and a plurality of brushes individually held in the brush holding frames.

3 Claims, 2 Drawing Sheets

BRUSH HOLDING DEVICE

BACKGROUND OF THE INVENTION

1. Field of the Invention

This invention relates to improvements in or relating to a brush holding device for use with an electric rotary machine.

2. Description of the Prior Art

An exemplary one of conventional brush holding devices for use with an electric rotary machine is disclosed, for example, in Japanese Utility Laid-Open No. 62-145454. The conventional brush holding device is first described with reference to FIGS. 4 and 5. The brush holding device includes a pair of negative (−) side brush holding frames *2a* and *2b* and another pair of positive (+) side brush holding frames *3a* and *3b* all formed from steel plates and disposed for sliding contact with a commutator 1. The positive side brush holding frames *3a* and *3b* are securely mounted at pairs of riveted fixing portions *5a* and *5b* thereof on a pair of mounting plates *4a* and *4b*, respectively. The mounting plates *4a* and *4b* are made of an electrically insulating synthetic resin material.

The negative-side brush holding frames *2a* and *2b* are securely mounted directly on a base plate 6 formed from a steel plate while the positive side brush holding frames *3a* and *3b* are securely mounted at pairs of riveted fixing portions *14a* and *14b* on the base plate 6 by way of the mounting plates *4a* and *4b*, respectively.

A pair of positive side brushes *7a* and *7b* are accommodated in spacings defined by the positive side brush holding frames *3a* and *3b* and the mounting plates *4a* and *4b*, respectively. Another pair of negative side brushes *8a* and *8b* are similarly accommodated in spacings defined by the negative side brush holding frames *2a* and *2b* and the base plate 6, respectively. The negative side brushes *8a* and *8b* are connected to the base plate 6 by way of a pair of negative side lead wires *9a* and *9b*, respectively. The negative side brushes *8a* and *8b* are electrically grounded by way of the base plate 6 formed from a steel plate and an end bracket (not shown) of a rotary machine in which the brush holding device is incorporated.

Meanwhile, the positive side brushes *7a* and *7b* and a connector 12 are connected to a power source not shown by way of a pair of positive side lead wires *10a* and *10b*.

The brushes *7a*, *7b*, *8a* and *8b* are normally urged into sliding contact with an outer periphery of the commutator 1 by respective brush springs 11. The base plate 6 is mounted on the aforementioned end bracket of the rotary machine by means of a female screw 13.

The conventional brush holding device is constructed in such a manner as described above. Thus, since the positive side brushes *7a* and *7b* are accommodated between the positive side holding frames *3a* and *3b* and the mounting plates *4a* and *4b*, respectively, and the mounting plates *4a* and *4b* are in turn securely mounted on the base plate 6 by riveting in such a manner as to establish an electrically isolated condition of the brushes *7a* and *7b*, the brush holding device includes a comparatively great number of components. Further, since the holding frames *3a* and *3b* are securely mounted on the mounting plates *4a* and *4b*, respectively, by riveting and the plates *4a* and *4b* are in turn securely mounted on the base plate 6 by riveting, the brush holding device is produced by way of a comparative large number of working steps. Besides, since the holding frames *2a*, *2b*, *3a* and *3b* are steel plate articles formed by bending of steel plates, there is a problem that they are likely to become rusty to cause the holding frame *2a*, *2b*, *3a* or *3b* to stick to the brush *7a*, *7b*, *8a* or *8b*.

SUMMARY OF THE INVENTION

It is an object of the present invention to provide a brush holding device wherein the number of components and the number of steps of production are reduced and a holding frame does not suffer from rust and hence does not stick to a brush.

In order to attain the object, according to the present invention, there is provided a brush holding device which comprises a base plate formed from a steel plate, a plurality of brush holding frames made of an electrically insulating synthetic resin material and secured to the base plate, and a plurality of brushes individually held in the brush holding frames.

With the brush holding device, since the brush holding frames made of an electrically insulating synthetic resin material are secured to the base plate formed from a steel plate, the number of components is reduced and the number of steps of producing the brush holding device is also reduced, and consequently, the brush holding device can be produced at a reduced cost. Besides, the brush holding frames do not suffer from rust, and consequently, the brushes and the holding frames are not caused to stick to each other. The brush holding device is thus superior in quality.

Preferably, the base plate has a plurality of pairs of pawls formed thereon by stamping while each of the brush holding frames has a pair of holes formed therein, and the pairs of pawls of the base plate extend through the holes of the brush holding frames and are bent in the radially or circumferentially opposite directions of the brush holding device to secure the brush holding frames to the base plate.

Preferably, each of the brush holding frames has a plurality of projections formed thereon while the base plate has a plurality of holes formed therein, and the projections of the brush holding frames are inserted in the holes of the base plate to prevent inadvertent radial and circumferential movement of the brush holding frames with respect to the base plate.

The above and other objects, features and advantages of the present invention will become apparent from the following description and the appended claims, taken in conjunction with the accompanying drawings in which like parts are denoted by like reference characters all through the drawings.

DESCRIPTION OF THE PREFERRED EMBODIMENT

Figure 1:
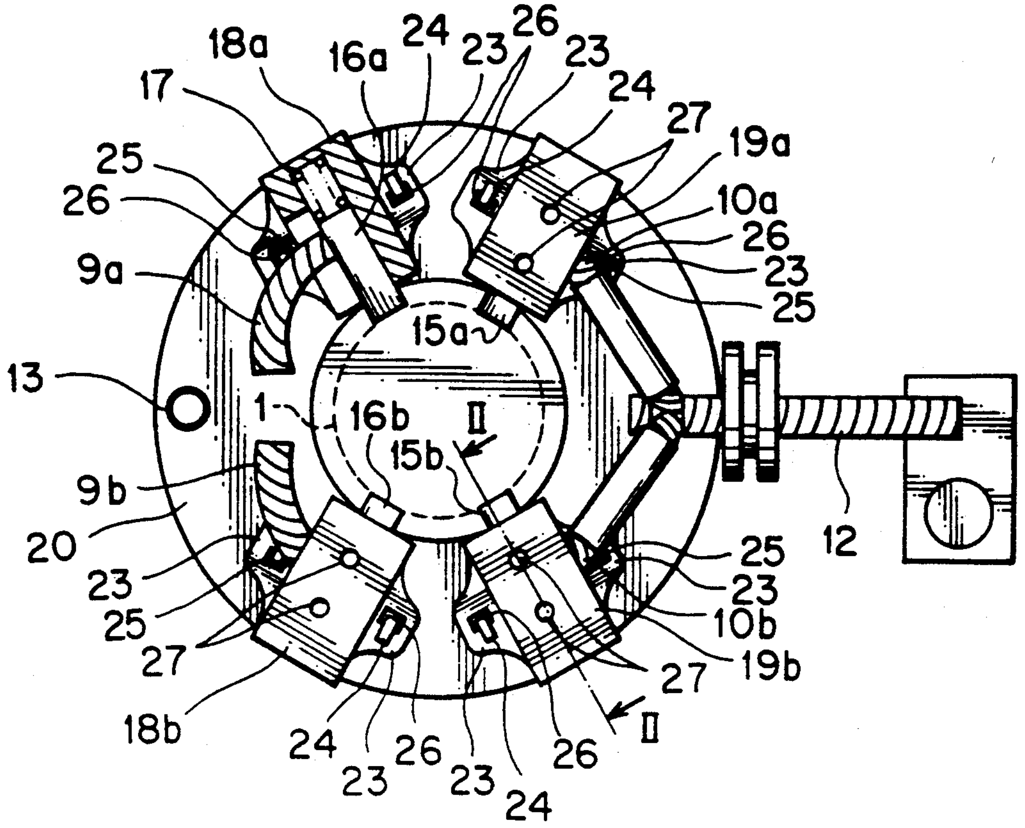
FIG. 1 is a plan view of a brush holding device showing a preferred embodiment of the present invention.
Figure 2:
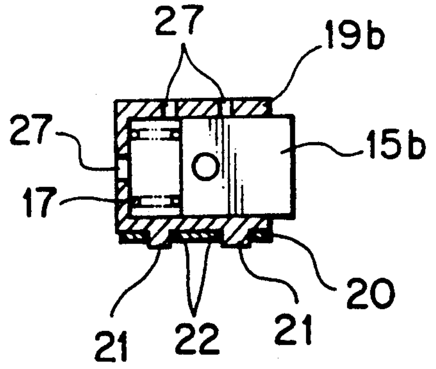
FIG. 2 is a sectional view taken along line II—II of FIG. 1.
Figure 3:
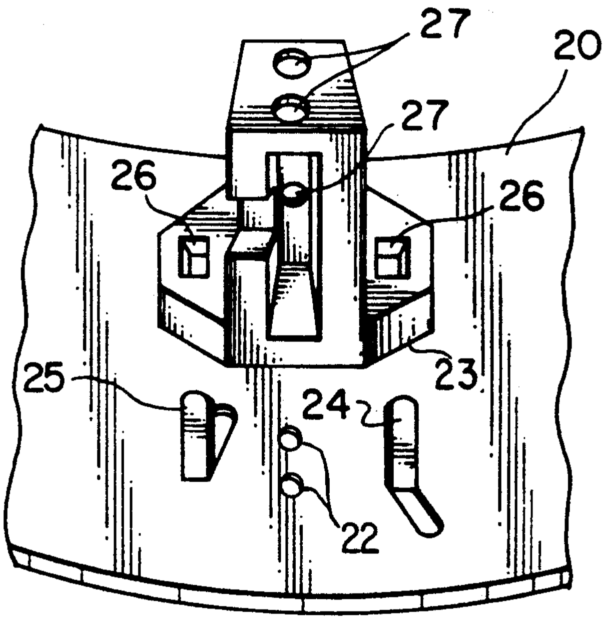
FIG. 3 is an enlarged perspective view showing a brush holding frame opposing a base plate.
Figure 4:
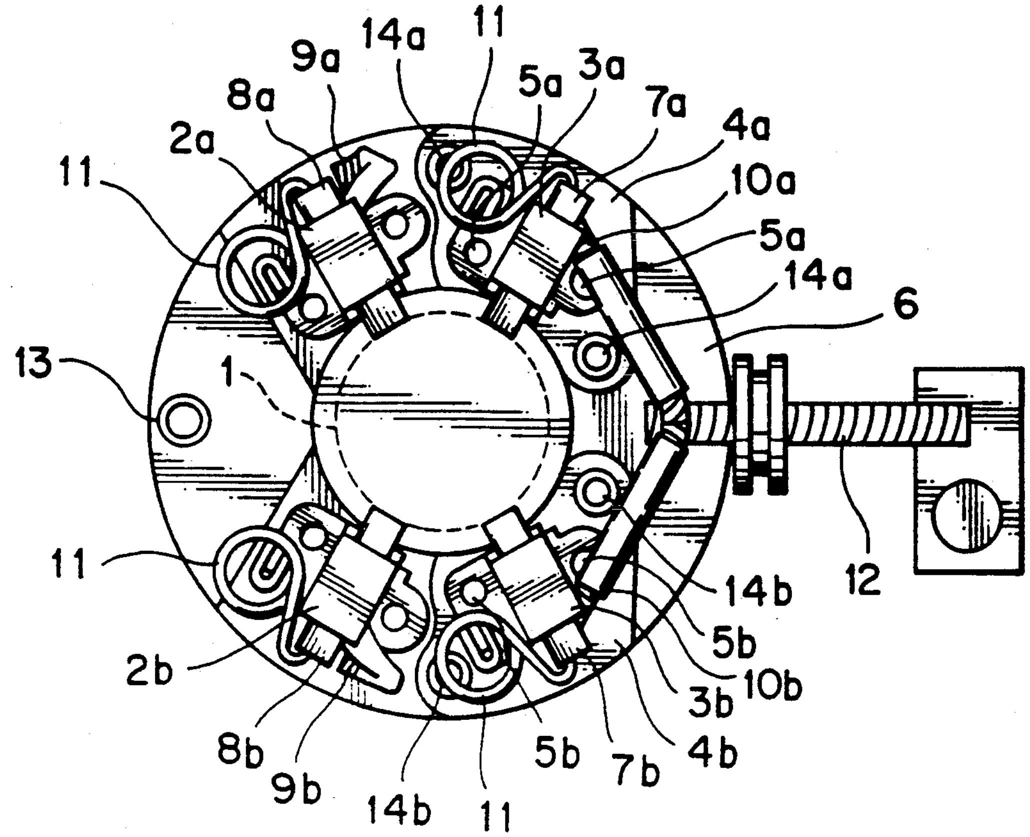
F I G. 4 PRIOR ART
FIG. 4 is a plan view of a conventional brush holding device.
Figure 5:
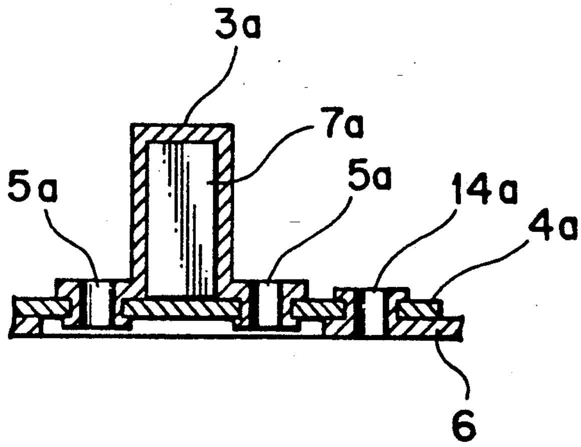
F I G. 5 PRIOR ART
FIG. 5 is an enlarged sectional view of the brush holding device of FIG. 4.

Referring to FIGS. 1 to 3, there is shown a brush holding device to which the present invention is applied. The brush holding device shown includes a pair of positive (+) side brushes 15*a* and 15*b* and a pair of negative (−) side brushes 16*a* and 16*b*. The positive side brushes 15*a* and 15*b* are held in positive side holding frames 19*a* and 19*b*, respectively, while the negative side brushes 16*a* and 16*b* are held in negative side holding frames 18*a* and 18*b*, respectively. Each of the positive and negative side brushes 15*a*, 15*b* and 16*a*, 16*b* is normally urged into sliding contact with an outer periphery of a commutator 1 by means of a brush spring 17. The positive and negative side holding frames 19*a*, 19*b* and 18*a*, 18*b* are formed by molding of an electrically insulating synthetic resin material and each has a plurality of projections 21 formed on a side face thereof at which it is mounted on a base plate 20 which is formed from a steel plate. The projections 21 of the holding frames 18*a*, 18*b*, 19*a* and 19*b* are inserted in positioning holes 22 formed in the base plate 20 to prevent inadvertent movement of the holding frames 18*a*, 18*b*, 19*a* and 19*b* in radially outward directions from a center axis of the commutator 1 and also in circumferential directions around the center axis of the commutator 1. A plurality of pairs of pawls 24 and 25 are formed on the base plate 20 by stamping as seen in FIG. 3 and inserted in insertion holes 26 formed in flange portions 23 of the holding frames 18*a*, 18*b*, 19*a* and 19*b*. The pawls 24 and 25 are bent laterally at free end portions thereof to secure the holding frames 18*a*, 18*b*, 19*a* and 19*b* to the base plate 20. It is to be noted that the pawls 24 and 25 are bent in the radially opposite directions so as to assure prevention of possible axial movement of the holding frames 18*a*, 18*b*, 19*a* and 19*b* with respect to the base plate 20. Each of the holding frames 18*a*, 18*b*, 19*a* and 19*b* has a plurality of heat radiating holes 27 formed therein.

The negative side brushes 16*a* and 16*b* are grounded respectively by way of a pair of negative side lead wires 9*a* and 9*b* which are secured to the base plate 20 by suitable means such as welding.

Since the brushes 15*a*, 15*b*, 16*a* and 16*b* are inserted respectively in the holding frames 18*a*, 18*b*, 19*a* and 19*b* made of a synthetic resin material and the holding frames 18*a*, 18*b*, 19*a* and 19*b* are in turn secured to the base plate 20 as described above, the number of components of the brush holding device is reduced and the number of steps of producing the brush holding device is also reduced comparing with those of the conventional brush holding device described hereinabove. It is to be noted that, while the pawls 24 and 25 provided on the base plate 20 are bent in the radially opposite directions in the embodiment described above, they may otherwise be bent in the circumferentially opposite directions.

Further, similar effects to those of the embodiment described above will be achieved alternatively if the holding frames 18*a*, 18*b*, 19*a* and 19*b* are secured to the base plate; and 20 by riveting or by some other means.

Having now fully described the invention, it will be apparent to one of ordinary skill in the art that many changes and modifications can be made thereto without departing from the spirit and scope of the invention as set forth herein.

What is claimed is:

1. A brush holding device, comprising:

a base plate, having a plurality of first holes, wherein said base plate is a formed steel plate;

a plurality of brush holding frames having a plurality of second holes and a plurality of projections made up of an electrically insulating synthetic resin material and secured to said base plate;

a means disposed within said second holes for securing said brush holding frames to said base plate so as to permit said projections to be inserted in corresponding said first holes, thereby preventing inadvertent radial and circumferential movement of said holding frames with respect to said base plate; and a plurality of brushes individually held in said brush holding frames.

2. A brush holding device as claimed in claim 1, wherein said means for securing comprises a plurality of pairs of pawls on said base plate, wherein said pairs of pawls of said base plate extend through said second holes of said brush holding frames and are bent in opposite directions of said brush holding device so as to secure said brush holding frames to said base plate, wherein said opposite directions are selected from a group consisting of a radial direction and a circumferential direction.

3. A brush holding device as claimed in claim 1, wherein said means for securing comprises means for permitting attachment by riveting.

* * * * *